US006675172B1

(12) United States Patent
Tolsma

(10) Patent No.: US 6,675,172 B1
(45) Date of Patent: Jan. 6, 2004

(54) DATA CONTROLLING DEVICE

(75) Inventor: Douwe Folkert Tolsma, Nieuwerkerk aan de Ijssel (NL)

(73) Assignee: Descartes Systems Europe B.V., Nieuwegein (NL)

( * ) Notice: Subject to any disclaimer, the term of this patent is extended or adjusted under 35 U.S.C. 154(b) by 0 days.

(21) Appl. No.: 09/207,420

(22) Filed: Dec. 8, 1998

(30) Foreign Application Priority Data

Dec. 8, 1997 (NL) ............................................. 1007722

(51) Int. Cl.[7] ............................................. G06F 17/30
(52) U.S. Cl. ............................. 707/102; 707/1; 707/10; 709/102
(58) Field of Search ........................ 707/1, 100, 102, 707/200, 10, 3; 709/102, 223; 712/220; 714/57; 705/7, 8

(56) References Cited

U.S. PATENT DOCUMENTS 5,566,333 A 10/1996 Olson et al. ................. 395/600
5,608,907 A * 3/1997 Fehskens et al. ........... 709/102
5,790,536 A * 8/1998 Mahany et al. ............. 370/338

OTHER PUBLICATIONS

Young–Chul Shim et al., Storage and Access of Temporal Information for the Management of Complex Systems, pp. 264–272 Applied Computing, Mar. 1–3, 1992.

* cited by examiner

*Primary Examiner*—Shahid Alam
(74) *Attorney, Agent, or Firm*—Young & Thompson

(57) ABSTRACT

A device for managing data relating to entities which may or may not be known beforehand comprises a central processing unit which, supplied with a suitable program code, is capable of receiving and storing the data in the form of status messages relating to one or more entities. The data is stored in a dynamic structure which for each entity provides space for a unique identification and for a first collection of references to possible subordinate entities and a second collection of references to superior entities. The structure is herein set up such that a status message relating to any entity is likewise valid for each subordinate entity associated with the relevant entity by means of its first collection.

4 Claims, 4 Drawing Sheets

DATA CONTROLLING DEVICE

BACKGROUND OF THE INVENTION

1. Field of the Invention

The present invention relates to a device managing data relating to entities which may or may not be known beforehand, comprising a central processing unit which, supplied with a suitable program code, is capable of receiving and storing the data in the form of status messages relating to one or more entities.

2. Description of the Related Art

Relational databases are mainly utilized nowadays for the management of such data. In relational databases relevant data is stored in one or more tables wherein a relation can be made between respective fields of different tables in order to express a correspondence. A large quantity of data can thus be stored and managed in a relatively well-organized manner.

A drawback associated with a device based on the use of relational databases as data structure is that for every type of entity for which data has to be recorded a table must be defined and in the case of a change in respect of organisation of the physical reality this entails that a re-modelling of the used software must also take place in order to implement therein types of entities unknown up until then. The relations established in the data structure moreover require that the linked records in the linked tables are fully filled before a meaningful correspondence can be expressed. This makes a relational database a relatively rigid and little flexible model for a reality in which organisations change continually and data is often supplied at a relatively random point in time. Operations wherein an association between occurrences from the same table is required a previously undetermined number of times, which is also designated as recursion, can also only be captured in a relational model with great difficulty.

SUMMARY OF THE INVENTION

The present invention has for its object inter alia to provide a device for managing data relating to entities which may or may not be known beforehand which on the contrary is particularly dynamic in the sense that no demands are made on the time sequence in which data is processed and organizational expansion and other changes in the reality can be accommodated practically without problem and often without any appreciable adaptation of the software.

In order to achieve the stated objective a device of the type mentioned in the preamble has the feature according to the invention that the data is stored in a dynamic structure which for each entity provides space for a unique identification and for a first collection of references to possible subordinate entities and a second collection of references to superior entities such that a status message relating to an entity is likewise valid for each subordinate entity associated with the relevant entity by means of its first collection. This feature of the device according to the invention is manifested in a data structure which can be designated mathematically as an acyclic digraph, which may or may not show cohesion. The supplied data in the form of status messages relating to the entities for monitoring can comprise, whether or not directly, an entry of a new entity or contain a status change relating to an entity already included in the structure. Such an event is then also applicable to all entities which are subordinate to the relevant entity and references of which are kept in the first collection with references. That the event is also valid for the subordinate entities also means ipso facto that the event is valid for all entities which in the structure are subordinate to said subordinate entities which can in turn be known from the corresponding first collections of the subordinate entities. This scenario is repeated until the 'bottom' of the structure is reached. An event thus propagates through the data structure along the paths set out by the relevant entities themselves, wherein these paths are set out in dynamic manner and do not have to be known beforehand, this in respect of number as well as route. For each entity in the structure applies here that the collection of status messages valid therefor is equal to the combination of status messages valid for all entities which may reach the relevant entity via any such random path, increased by the status messages which have been directly assigned to the relevant entity itself. This mechanism, which will be designated as status propagation hereinbelow, makes the set-up according to the invention particularly flexible and robust. Organizational changes can be accommodated therein without problem and often without any necessary modification of the software used, while filling in of the structure will make no demands on the time sequence in which the data is supplied and alternative structures can moreover coexist.

At any moment the status of a random entity can be retrieved owing to the second collection of references which makes it possible to run through the structure in opposite direction in order to thus enable building up of the complete collection of status messages valid for the relevant entity. It is therefore not required to store a complete collection at each entity of all status messages applicable to this relevant entity. In a preferred embodiment the device according to the invention therefore has the feature that the supplied status messages are stored solely at the entity to which a relevant status message directly relates. An exceptionally compact and efficient data structure can be obtained by thus only storing supplied status messages singly and only accessing them if there is occasion to do so.

In a particular embodiment the device according to the invention has the feature that an entity is uniquely identified by a designation of an organizational unit within which the entity exists together with a coding which is unique at least within said organizational unit. Such a combination of designations for an entity offers sufficient guarantee that different entities can each be identified uniquely without an unambiguous nomenclature having to be defined beforehand. This makes a significant contribution to the dynamic capability, the reliability and the expandability of the device according to the invention.

In its basic embodiment the device according to the invention already manages the data entrusted thereto in a particularly efficient and dynamic manner owing to the above described structured manner of storage. Status messages, once stored, can be traced at all times via a dynamically created status propagation path. It can nevertheless be laborious and time-consuming, particularly in the case of large to very large data systems, to locate unforeseen exceptions among all stored data. In order to address this problem a particular embodiment according to the invention has the feature that at least one conditional statement is linked to one or more entities in the structure, which statement results in the outcome provided therein if the set condition is fulfilled. One or more such conditional statements can thus be incorporated into the data structure, which are simply designated as triggers and which can be designed such that exceptions are automatically located. Status messages can herein be represented mathematically as points in an n-dimensional space, while such a trigger forms a body in this same space. Examples of said dimensions are time, geographical length and width. An exception of an entity is detected if a status message, which is associated by status propagation or otherwise with the relevant entity and is represented as a point in said n-dimensional space, lies enclosed in said body. The non-validity of the set condition at a pre-determined moment can also be interpreted as an exception and as such can be detected in similar manner.

When such a trigger is added to an entity, all status propagation paths which lead to the relevant entity are run through once-only in reverse sequence to evaluate whether the set to condition has already been fulfilled. The second collection of references serves for this purpose. The condition has then only to be checked if a new status message is allocated to the entity either by status propagation or by direct allocation. If the device receives a new status message relating to any entity, there will then always be a complete run through all status propagation paths from this entity in order to evaluate all possible triggers within these paths. In addition, adding an association between two entities also results in an evaluation of all occurring triggers which can be found in the status propagation paths from the subordinate of the two relevant entities.

In a further particular embodiment the device according to the invention has the feature that a designation is linked to one or more entities which indicates a type of entity within a categorization of occurring entities. Such a categorization of the entities facilitates to a considerable degree the response to more general queries which are not specifically focussed on one or more entities as such but which instead attempt to obtain a reply concerning a whole group of entities. Said categorization herein enables identification, and thus selection, of determined groups of entities within the data structure. A categorized classification of entities as referred to here also facilitates the introduction of a new type of entity.

Applied to a logistical working environment, a question could for instance arise with respect to all means of transport together, without being specifically interested in particular types of transport. The above-mentioned categorization nevertheless provides the option of unambiguous designation of diverse types of transport means as transport means, so that this group can be localized easily within the device. Thus, the device according to the invention can advantageously be used logistically for the purpose of for instance a dynamic control of a flow of goods, a logistical performance analysis, transport and production planning and for sales support, wherein a desired group of logistical units is selected each time, taking into account status messages attributed thereto directly or on the basis of status propagation.

BRIEF DESCRIPTION OF THE DRAWINGS

The invention will be further elucidated hereinbelow with reference to an embodiment and an associated drawing. In the drawing:

FIGS. 1A–1D illustrate the operation of the device according to the invention on the basis of a logistical example wherein at some moment an order is placed for delivery of one or more products including a video recorder, here given by way of illustration.

DESCRIPTION OF THE PREFERRED EMBODIMENTS

In this example the order forms the first entity for which the data is supplied to the device. The relevant data is indicated schematically in frame I in FIG. 1A and generally comprise a categorization A of the type of entity, in this case an order and an identification B of the relevant entity, in this case the order number 9539383, optionally supplemented with a designation C of those to whom the entity can be attributed, in this case the name of the customer, Buyer. This latter addition provides an additional guarantee of the uniqueness of the identification chosen for a determined entity. The data of order I also contains in this case a status message e4 signifying that the delivery of the ordered article has been agreed for Aug. 20, 1997 in the United States of America (US) at Alden Manor, N.Y. A status message generally takes the form of a designation of a place and time (period) in combination with a determined quality such as the planning given here as example or an estimate or such as an actual event or status, for instance ordered, delivered, stolen, shipped and the like.

Figure 1A:
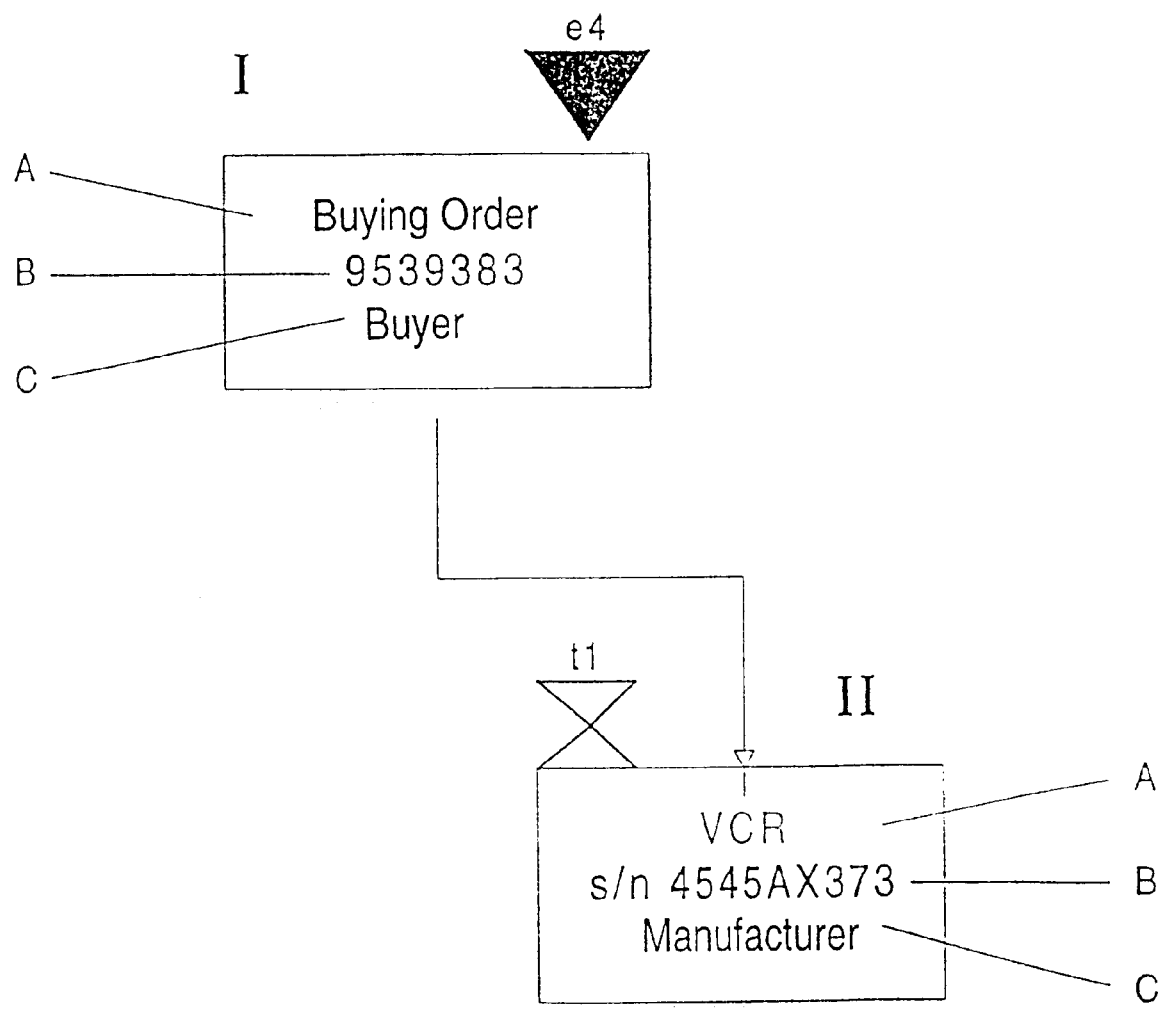
FIGS. 1A–1D show a schematic representation of a data structure in an embodiment of the device according to the invention.

The data of the second entity meanwhile involved in this example is also supplied to the device, this being shown in the second frame II in FIG. 1A. This is the data relating to the video recorder which has been ordered, which data here also comprises a categorization A, VCR, and a unique identification in the form of a serial number B, s/n 4545AX373, and a designation C of the manufacturer, Manufacturer A. A conditional statement t1, a so-called trigger, is also linked to the article here. This trigger t1 contains the condition that the article be actually delivered between August 17 and August 21 within a radius of 10 km of Alden Manor.

This statement is then checked continuously in a manner which will become apparent hereinbelow. As soon as it is established that the set condition has not been fulfilled, the device will autonomously put into effect the consequence foreseen in the statement, which could mean that an exception message is sent to a responsible person or department or to another automated system so that action can be undertaken thereon.

According to the invention the device stores the data supplied thereto in a dynamic structure having therein for each entity, in addition to its core data as mentioned above, a first collection of references to possible subordinate entities as well as a second collection of references to possible superior entities in the data structure. The device herein provides an organisation of the data such that a status message relating to a certain entity is likewise always valid for each subordinate entity associated with the relevant entity by means of its first collection. In this embodiment the first collection of references of the order comprises a reference to the video recorder, while a references to the order is included in the second collection with references which are recorded by the device at the video recorder. This above described hierarchy is expressed by the connecting lines between the separate entities and the direction designated therein, always pointing to a subordinate entity.

Although the status messages for each entity are also valid for all entities directly or indirectly subordinate thereto, the device according to this embodiment only stores the data thereof at the directly involved entity and not also at all subordinate entities, thus saving considerable memory space. All status messages for each entity can nevertheless always be known by running through all paths upstream from the relevant entity, which paths can always be retrieved at the entities within these paths owing to the second collections of references. The moment a trigger such as t1 is placed, a run upward through all paths is thus made to ascertain directly whether or not the set conditional statement has been complied with. The trigger is likewise checked if a change occurs in the structure or content of the superior entities because an entity is added, an association between different entities is made or a status message or event is attributed to one of the superior entities. In this case the device will propagate the relevant data along all paths to the subordinate entities, for which the new data is anyway also valid by definition. This mechanism which is designated in the present application as status propagation, not only provides a particularly advantageous allocation of the available storage memory but also ensures that time sequence plays no part in the processing of separate data, whereby an extremely dynamic and flexible system is obtained.

In the present case, wherein the video recorder II is subordinate to the order I, it is possible for instance to deduce that video recorder II must be delivered by agreement as provided for in status message e4 of order I. When trigger t1 is placed, an upward run will be made through the path to order I to ascertain whether or not the statement included therein has already been complied with. The statement will then always be checked if a new status message is assigned to video recorder II or a change occurs in the entities superior to video recorder II which, due to the above discussed mechanism of status propagation, is then also valid for video recorder II. It is therefore irrelevant whether such a status message reaches the system first or whether trigger t1 is placed first. It is not even a requirement that all entities which will eventually form part of the chain to fulfill the order are known beforehand. The device allows the data structure slowly but surely to build itself up and fill itself in autonomously, wherein the completeness of the data is important only for the depth with which at a certain moment, useful information can be derived therefrom.

Figure 1B:
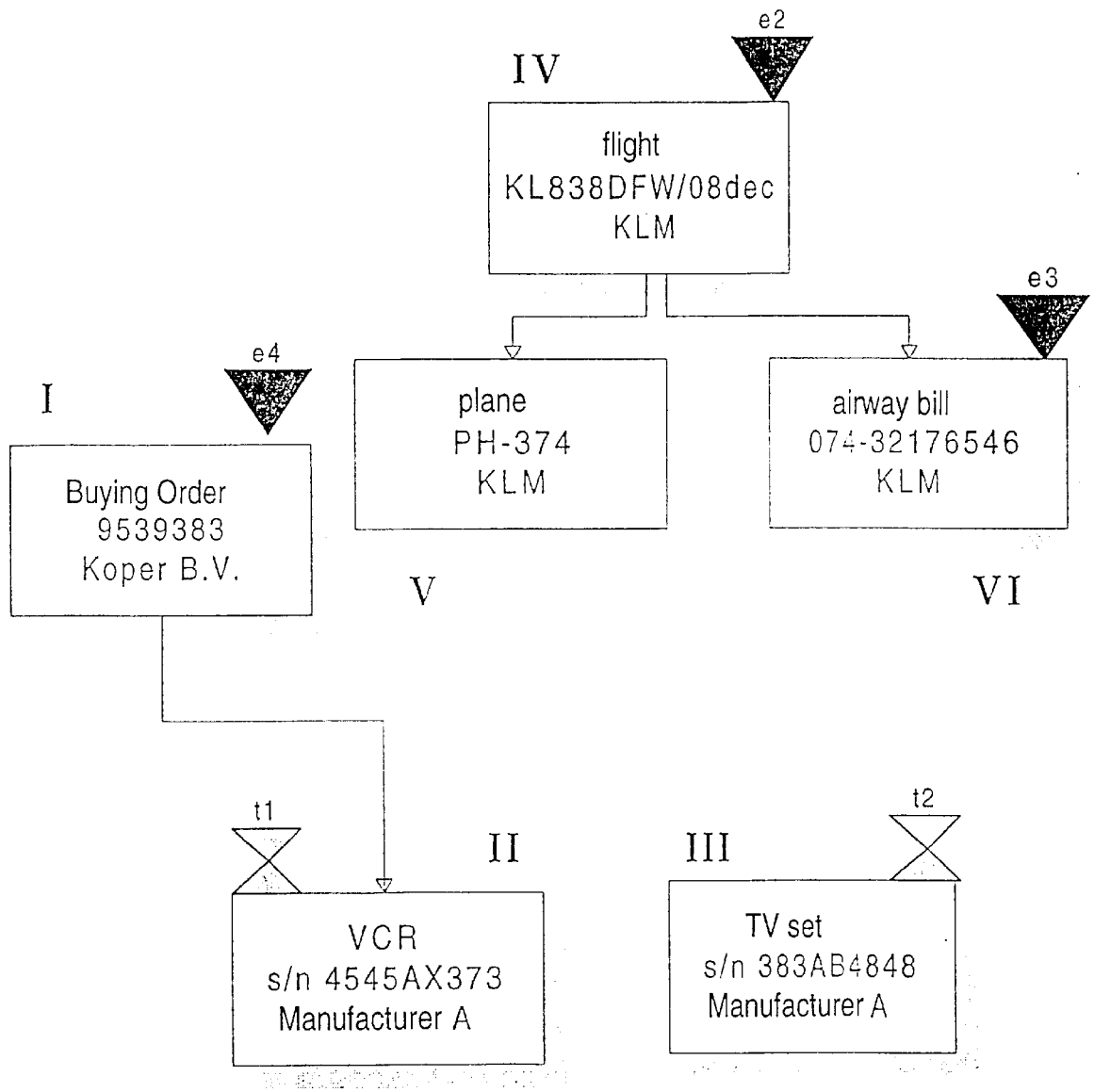

FIG. 1B shows a random view of the data structure as it is recorded by the device at a later time. The structure has meanwhile been expanded with four further entities. Frame III thus shows that at some moment the existence of a TV set has been reported to the device, which TV set is uniquely identified by means of its serial number, s/n 383AB4848, together with a designation of its origin at Manufacturer A. Also placed at this entity, at the same moment or otherwise, is a trigger t2, containing the conditional statement that if the set is not actually delivered between August 18 and August 24 within a radius of 10 km of Alden Manor, U.S., a determined consequence takes effect or is initiated, such as an error message to a responsible person. The TV set has (as yet) no link to subordinate or superior entities.

In addition, three other entities have meanwhile been included by the device in the data structure at the stage of FIG. 1B. These are a flight IV with the designation KL838DWF/08dec to be performed by airline company KLM, the arrival of which according to the status message e2 attributed thereto is planned for the morning of August 18 at John F. Kennedy airport in New York in the US. The flight is carried out with an aircraft further identified in the data structure in frame V by means of the aircraft code PH-374 and the owner of the aircraft KLM. Transported on the flight among other things will be freight which is further stated in an air freight consignment note relating thereto, shown in frame VI, with the unique identification 074-32176546. The air freight consignment note VI meanwhile also has a status message e3, i.e. that the relevant freight is delivered according to plan on August 18 at John F. Kennedy airport.

The connecting lines show the mutual hierarchy of the entities, which on the basis of the shown stage of the data structure indicates that status message e2 is also valid for the aircraft V and the air freight consignment note VI, i.e. these latter adopt the same planning as was attributed to flight IV. It is otherwise noted that although a sequence is present in the designation of the different entities, status messages and triggers, this sequence by no means designates a sequence in time. The moment at which the different entities, status messages, triggers and hierarchical links between entities are reported to the device is per se irrelevant, but only plays a part in terms of the information which can be extracted from the device at any moment.

Figure 1C:
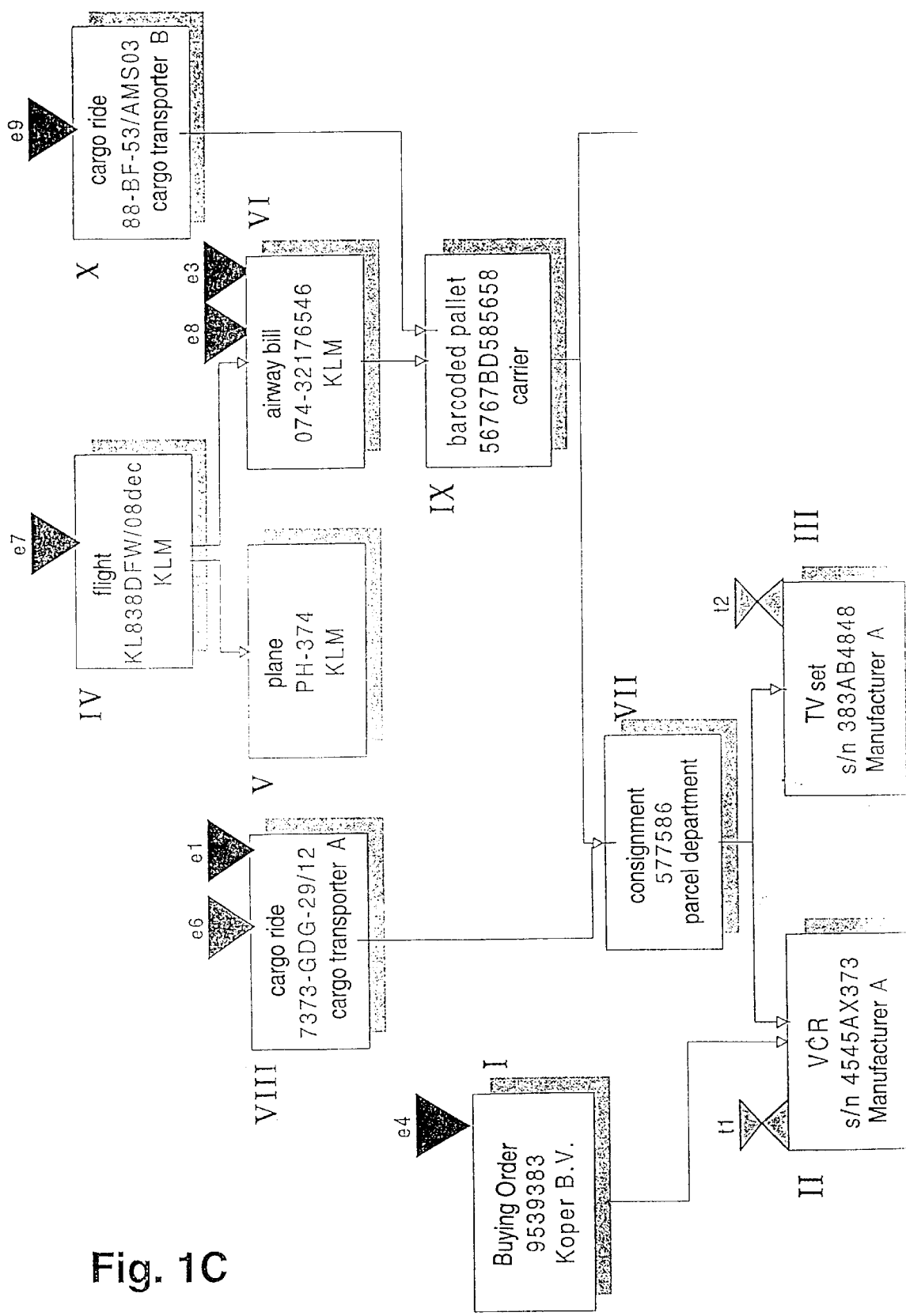

In FIG. 1C the data structure is further expanded with another four entities which have meanwhile been made known to the device. In addition, a number of hierarchical links have been added and a number of status messages have in the meantime been processed in the structure by the device. The structure therefore now comprises an entity shipment shown in frame VII and designated by its number, 577586, and the identity of the relevant courier service, courier, which shipment lies hierarchically immediately above video recorder II and immediately above TV set III. From this hierarchy can be derived that both articles II, HI form part of the same shipment VII and that everything which applies to this shipment is also applicable to both articles.

Above shipment VII the entity freight journey is shown in frame VIII with the unique identification number 7373-GDG-29/12 in combination with the name of the transport company, Freight carrier A. Also linked to the journey VIII is a status message e6 signifying that the journey was completed on August 17 with an arrival at Schiphol Airport, Netherlands at 16.00 hours (CET).

The device has further processed the entity pallet 5676BD585658 of transporter transporter into the data structure, shown in frame IX, which in view of the placing thereof hierarchically above shipment VII indicates that the shipment forms part of the pallet, since everything which is applicable to pallet IX is likewise applicable to the shipment VII subordinate thereto.

The data structure also contains a second freight journey, shown in frame X, designated with 88-BF-53/AMS03 and carried out by transport company *Freight carrier B*. The status message e5 linked to this freight journey shows a planned delivery for August 19 at 15.00 hours (EST) in a determined shopping centre in Alden Manor, N.Y., which planning therefore also applies to pallet IX, shipment VII and video recorder II and TV set III.

Finally, two new status messages e7, e8 have been entered into the device respectively signifying that flight IV has actually arrived at John F. Kennedy airport on August 18 at 10. 15 hours (EST) and that the freight consignment note has actually been processed on August 18 at 15.00 hours (EST) at John F. Kennedy airport.

Figure 1D:
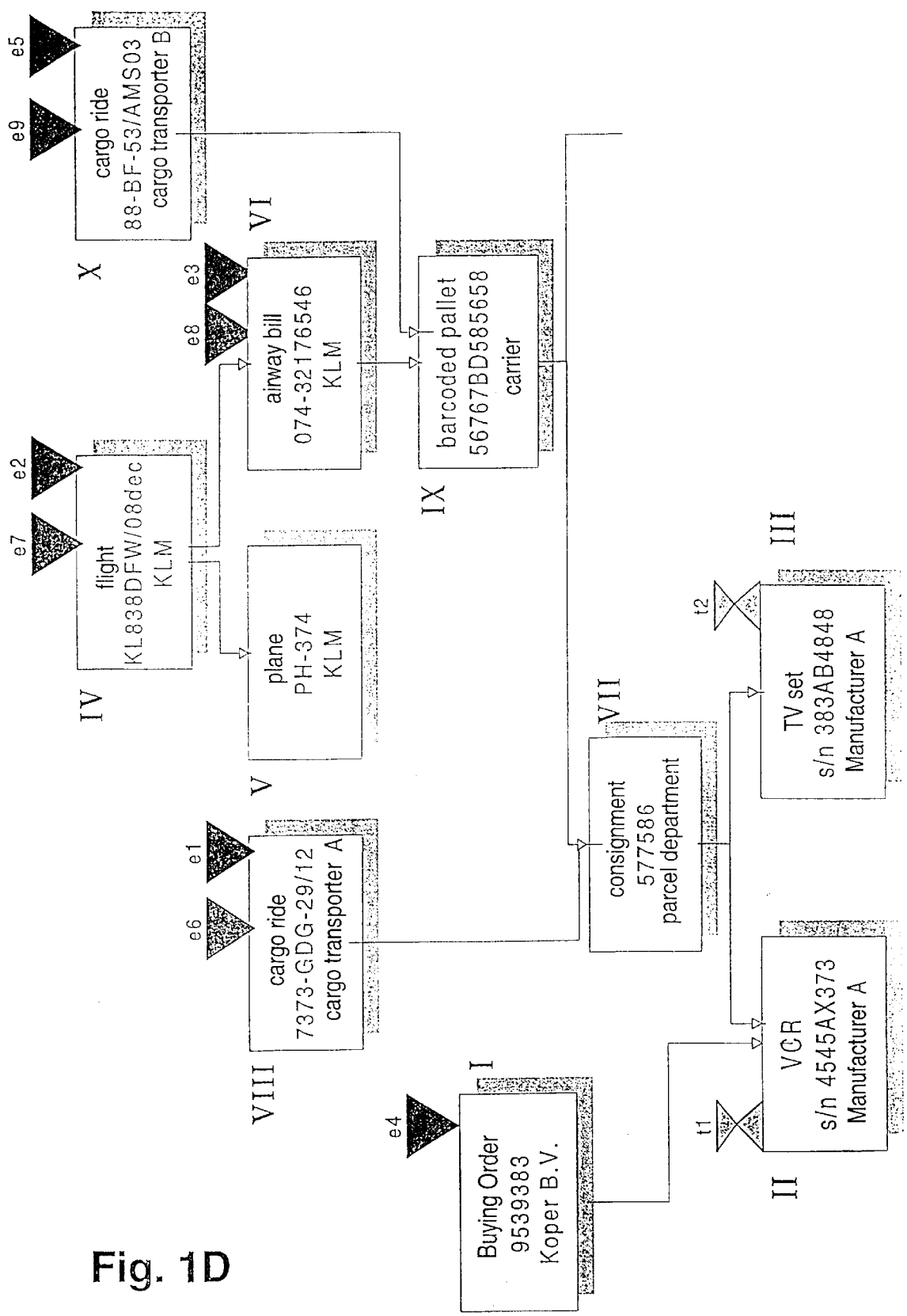

FIG. 1D shows an overview of the data structure after it has been filled in still further in that two status messages e1 and e5 have been processed therein signifying respectively the planning e1 of freight journey VIII to pick up a cargo on August 17 at 15.00 hours (CET) at the destination in a warehouse in Rotterdam and the planning e5 that the cargo of freight journey X is delivered in a determined shopping centre in Alden Manor, New York on August 19 at 15.00 hours (EST). It will be apparent that it is not important for the device that these plans are only processed after the actual implementations e6, e9 have already been stored in the structure.

All the above-mentioned additions of entities, status messages and links between entities can be processed independently of each other in a random sequence, wherein the processing of the one data is in no way dependent upon the processing of another data. The data can also be supplied by relatively random and, from case to case, different links in the logistical route occurring in reality, for instance purely in relation to its individual part in that route. Additional data will always propagate downwards in the structure in the directions indicated by the arrows in order to evaluate possible triggers encountered therein, while when a trigger is added an evaluation precisely in reverse direction takes place. The first and second collections with references which are kept at each entity herein always point the way respectively to the directly subordinate entities and the directly superior entities. The device is thus capable of filling in and updating the structure in wholly dynamic manner, wherein the following diagram shows an overview of the first and second collections with references according to the invention as well as the data applicable to the entities at the stage of FIG. 1D, wherein the penultimate column indicates at which entity the data is stored:

| entity: | first collection: | second collection | direct data | applicable data |
|---------|-------------------|-------------------|-------------|-----------------|
| I       | II                |                   | e4          | e4              |
| II      |                   | I, VII            | t1          | t1, e1 ... e9   |
| III     |                   | VII               | t2          | t2, e1 ... e3, e5 ... e9 |
| IV      | V, VI             |                   | e2, e7      | e2, e7          |
| V       |                   | IV                |             | e2, e7          |
| VI      | IX                | IV                | e3, e8      | e2, e3, e7, e8  |
| VII     | II, III           | VIII, IX          |             | e1 ... e3, e5 ... e9 |
| VIII    | VII               |                   | e1, e6      | e1, e6          |
| IX      | VII               | VI, X             |             | e2, e3, e5, e7, e8, e9 |
| X       | IX                |                   | e5, e9      | e5, e9          |

It is possible to derive from the structure that video recorder II, which was ordered according to order I and has to be delivered in Alden Manor on August 18, forms part of a shipment VII together with TV set III and was transported as such from Rotterdam with freight journey VIII. This journey VIII took the shipment to Schiphol airport where the shipment forms part of the freight according to air freight consignment note VI, in the meantime reloaded onto pallet IX. The freight of air freight consignment note VI was transported on flight IV to John F. Kennedy airport making use of aircraft V. The pallet IX was picked up from John F. Kennedy airport in freight journey X and transported to Alden Manor where the freight was delivered on August 20 at 8.30 hours (EST). This is within the conditional statement of trigger 1 which thereby had no reason to cause the consequence provided for therein to take effect.

It will be apparent that although the data used in this example was given solely by way of illustration, in reality a comparable structure can be manufactured by the device in completely analogous manner on the basis of actual data. Also in this case nothing need be known beforehand about the exact definition of the delivery route between order and actual delivery and the device according to the invention provides an extremely flexible system for trouble-free processing of all data supplied at a random moment into an ordered structure of the type as shown in the figures, mathematically designated as an acyclic digraph.

Although the invention has been further elucidated on the basis of only this one example, it will be apparent that for a skilled person many more variations are possible without departing from the scope of the present invention. Thus, in addition to managing logistic routes such as the so-called trace-and-track system of the embodiment, the device can in principle be employed advantageously for any application which involves managing data relating to entities which are not always known beforehand but which may nevertheless be mutually associated. As such the device can for instance be employed for the detection of for instance bacterial contaminants in foodstuffs. Assuming that, if contaminated ingredients are used in the preparation of foodstuffs, there is a danger of a foodstuff in turn containing a contaminant, the device can be employed to monitor this, wherein, instead of status messages as supplied basic data, contamination messages will propagate through the structure set up by the device. Examples of entities within such a structure may then be an individual cow designated by its name and farmer, a determined stall with cows of a determined farmer, descendants of said cow, a meat-processing company, a production line within said meat-processing company, a restaurant, a company canteen as well as all other links with which the foodstuff comes into contact in any way.

By way of another example, the use of the device is further possible for detecting malfunction in electronic components. A consumer electronics manufacturer wishes for instance to improve the quality of its own product by an analysis of defective products. A problem here is that in practice repair services and other after-sales services are hardly able to detect which component is the actual cause of the fault. However, by classifying malfunctions according to type, for instance short-circuit, infinite resistance, smell of burning, types of undesired behaviour and the like, and by recording this for each product type wherein malfunctions of individual components propagate to modules and malfunctions in modules propagate to complete products in accordance with the above described scenario, conclusions can eventually be drawn, such as for instance that malfunctions in a particular product can be attributed to a considerable extent to a determined component therein. Every department involved in the product can supply data at its own level which is still understandable to it—for instance the designer at component level, the repairer at module level and the dealer at product level—wherein none of these need have exact knowledge of the full operation of the product, while a diagnosis is still possible eventually.

The device can also be used on the basis of the data structure described in the embodiment not only to monitor a flow of goods or order dispatch but can likewise be employed as locating system for the transport means used, in the embodiment the aircraft, trucks and pallets.

It will be apparent that the invention provides a device which in terms of versatility and field of application is well nigh unlimited, if only due to the flexibility and dynamics with which the device can be adapted to changing conditions.

What is claimed is:

1. Device for managing data relating to entities which may or may not be known beforehand, comprising a central processing unit which, supplied with a suitable program code, is capable of receiving and storing the data in the form of status messages relating to one or more entities, characterized in that the data is stored in a dynamic structure which for each entity provides space for a unique identification and for a first collection of references to possible subordinate entities and a second collection of references to superior entities such that a status message relating to an entity is likewise valid for each subordinate entity associated with the relevant entity by means of its first collection wherein the device is characterized in that at least one conditional statement is linked to one or more entities in the structure, which statement results in the outcome provided therein as soon as the set condition is fulfilled.

2. Device as claimed in claim 1, characterized in that the supplied status messages are stored solely at the entity to which a relevant status message directly relates.

3. Device as claimed in claim 1 characterized in that an entity is uniquely identified by a designation of an organizational unit within which the entity exists together with a coding which is unique at least within said organizational unit.

4. Device as claim 1, characterized in that a designation is linked to one or more entities which indicates a type of entity within a categorization of occurring entities.

* * * * *